United States Patent
Smith et al.

(10) Patent No.: US 10,366,169 B2
(45) Date of Patent: *Jul. 30, 2019

(54) REAL-TIME NATURAL LANGUAGE PROCESSING OF DATASTREAMS

(71) Applicant: Intel Corporation, Santa Clara, CA (US)

(72) Inventors: Elliot Smith, Northfield (GB); Victor Szilagyi, London (GB)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/652,030

(22) Filed: Jul. 17, 2017

(65) Prior Publication Data

US 2018/0067925 A1    Mar. 8, 2018

Related U.S. Application Data (63) Continuation of application No. 13/992,406, filed as application No. PCT/US2011/067623 on Dec. 28, 2011, now Pat. No. 9,710,461.

(51) Int. Cl.
*G06F 17/27* (2006.01)
*G06F 17/28* (2006.01)
(Continued)

(52) U.S. Cl.
CPC .............. *G06F 17/28* (2013.01); *G06F 3/048* (2013.01); *G06F 16/3344* (2019.01);
(Continued)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 5,946,046 A    8/1999  You et al.
6,141,678 A    10/2000 Britt, Jr.
(Continued)

FOREIGN PATENT DOCUMENTS

CN    104025077 A    9/2014
CN    104025077 B    10/2017
(Continued)

OTHER PUBLICATIONS

"U.S. Appl. No. 13/992,406, Advisory Action dated Jan. 27, 2017", 4 pgs.

(Continued)

*Primary Examiner* — Lamont M Spooner
(74) *Attorney, Agent, or Firm* — Schwegman Lundberg & Woessner, P.A.

(57) ABSTRACT

Systems and methods for identifying and locating related content using natural language processing are generally disclosed herein. One embodiment includes an HTML5/JavaScript user interface configured to execute scripting commands to perform natural language processing and related content searches, and to provide a dynamic interface that enables both user-interactive and automatic methods of obtaining and displaying related content. The natural language processing may extract one or more context-sensitive key terms of text associated with a set of content. Related content may be located and identified using keyword searches that include the context-sensitive key terms. For example, text associated with video of a first content, such as text originating from subtitles or closed captioning, may be used to perform searches and locate related content such as a video of a second content, or text of a third content.

27 Claims, 6 Drawing Sheets

(51) Int. Cl.
   *G06F 16/33*       (2019.01)
   *G06F 16/783*      (2019.01)
   *H04N 21/41*       (2011.01)
   *H04N 21/435*      (2011.01)
   *H04N 21/4722*     (2011.01)
   *H04N 21/8405*     (2011.01)
   *G06F 3/048*       (2013.01)

(52) U.S. Cl.
   CPC .......... *G06F 16/7844* (2019.01); *G06F 17/27* (2013.01); *H04N 21/4126* (2013.01); *H04N 21/4355* (2013.01); *H04N 21/4722* (2013.01); *H04N 21/8405* (2013.01)

(58) Field of Classification Search
   CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
   USPC ............................ 704/1, 9, 10; 707/706–708
   See application file for complete search history.

(56)                References Cited

U.S. PATENT DOCUMENTS

| | | | |
|---|---|---|---|
| 6,751,776 | B1 * | 6/2004 | Gong ................ G06F 17/30616 707/E17.028 |
| 7,046,914 | B2 | 5/2006 | Jasinschi et al. |
| 8,005,826 | B1 * | 8/2011 | Sahami ............. G06F 17/30023 707/723 |
| 8,484,192 | B1 * | 7/2013 | Sahami ............. G06F 17/30864 707/708 |
| 8,799,765 | B1 | 8/2014 | Macinnis et al. |
| 9,071,852 | B2 * | 6/2015 | Choi ................ H04N 21/23418 |
| 9,170,700 | B2 * | 10/2015 | Kaiser ..................... G06F 3/048 |
| 9,710,461 | B2 | 7/2017 | Smith et al. |
| 2003/0191754 | A1 | 10/2003 | Dey et al. |
| 2005/0073608 | A1 | 4/2005 | Stone et al. |
| 2007/0244902 | A1 * | 10/2007 | Seide ................ G06F 17/30796 |
| 2008/0140385 | A1 | 6/2008 | Mahajan et al. |
| 2008/0162454 | A1 * | 7/2008 | Lundell .............. G06F 17/3002 |
| 2008/0183681 | A1 * | 7/2008 | Messer ............. G06F 17/30796 |
| 2008/0183698 | A1 * | 7/2008 | Messer ............. G06F 17/30038 |
| 2008/0201434 | A1 | 8/2008 | Holmes et al. |
| 2008/0266449 | A1 * | 10/2008 | Rathod ............. G06F 17/30796 348/468 |
| 2009/0018832 | A1 * | 1/2009 | Mukaigaito ......... G10L 15/1815 704/251 |
| 2009/0083260 | A1 * | 3/2009 | Artom ............... G06F 17/30817 |
| 2009/0164460 | A1 * | 6/2009 | Jung ................. G06F 17/30793 |
| 2010/0057694 | A1 * | 3/2010 | Kunjithapatham ........................ G06F 17/30781 707/E17.009 |
| 2010/0121973 | A1 | 5/2010 | Lobacheva et al. |
| 2010/0211605 | A1 * | 8/2010 | Ray ................... G06F 17/30023 707/780 |
| 2010/0293190 | A1 | 11/2010 | Kaiser et al. |
| 2011/0047163 | A1 * | 2/2011 | Chechik ............ G06F 17/30781 707/741 |
| 2011/0119595 | A1 | 5/2011 | Bydeley et al. |
| 2011/0202515 | A1 * | 8/2011 | Stiers ................ G06F 17/30029 707/706 |
| 2011/0321098 | A1 | 12/2011 | Bangalore et al. |
| 2012/0079380 | A1 * | 3/2012 | Tsai .................. G06F 17/30817 715/716 |
| 2015/0019203 | A1 | 1/2015 | Smith et al. |

FOREIGN PATENT DOCUMENTS

| | | |
|---|---|---|
| CN | 20770449 A | 2/2018 |
| EP | 2798529 A1 | 11/2014 |
| JP | 2010519609 A | 6/2010 |
| JP | 2010146570 A | 7/2010 |
| JP | 2010154415 A | 7/2010 |
| JP | 2010170191 A | 8/2010 |
| JP | 2011145896 A | 7/2011 |
| JP | 5922255 B2 | 5/2016 |
| KR | 101777981 B1 | 9/2017 |
| TW | I223162 B | 11/2004 |
| TW | 201346595 A | 11/2013 |
| TW | I493363 B | 7/2015 |
| WO | WO-2013100978 A1 | 7/2013 |

OTHER PUBLICATIONS

"U.S. Appl. No. 13/992,406, Final Office Action dated Oct. 4, 2016", 19 pgs.
"U.S. Appl. No. 13/992,406, Non Final Office Action dated Jun. 2, 2016", 20 pgs.
"U.S. Appl. No. 13/992,406, Notice of Allowability dated Jun. 16, 2017", 9 pgs.
"U.S. Appl. No. 13/992,406, Notice of Allowance dated Mar. 10, 2017", 11 pgs.
"U.S. Appl. No. 13/992,406, Response filed Aug. 18, 2016 to Non Final Office Action dated Jun. 2, 2016", 9 pgs.
"U.S. Appl. No. 13/992,406, Response filed Dec. 29, 2016 to Final Office Action dated Oct. 4, 2016", 10 pgs.
"U.S. Appl. No. 13/992,406, Response filed Feb. 3, 2017 to Advisory Action dated Jan. 27, 2017 and to Final Office Action dated Oct. 4, 2016", 11 pgs.
"Chinese Application Serial No. 201180075980.6 Office Action dated Dec. 1, 2015", W/ English Translation, 10 pgs.
"Chinese Application Serial No. 201180075980.6, Office Action dated Jun. 13, 2016", W/ English Translation, 22 pgs.
"Chinese Application Serial No. 201180075980.6, Office Action dated Dec. 27, 2016", w/English Translation, 20 pgs.
"Chinese Application Serial No. 201180075980.6, Response filed Mar. 13, 2017 to Office Action dated Dec. 27, 2016", w/ claims in English, 17 pgs.
"Chinese Application Serial No. 201180075980.6, Response filed Apr. 6, 2016 to Office Action dated Dec. 1, 2015", W/ English Claims, 13 pgs.
"Chinese Application Serial No. 201180075980.6, Response filed Aug. 12, 2016 to Office Action dated Jun. 13, 2016", W/ English Claims, 8 pgs.
"European Application Serial No. 11878980.9, Extended European Search Report dated Oct. 2, 2015", 9 pgs.
"European Application Serial No. 11878980.9, Response filed May 2, 2016 to Extended European Search Report dated Oct. 2, 2015", (English Translation of Claims), 12 pgs.
"International Application Serial No. PCT/US2011/067623, International Preliminary Report on Patentability dated Jul. 10, 2014", 6 pgs.
"International Application Serial No. PCT/US2011/067623, Search Report dated Aug. 31, 2012", 3 pgs.
"International Application Serial No. PCT/US2011/067623, Written Opinion dated Aug. 31, 2012", 4 pgs.
"Japanese Application Serial No. 2014-548776, Office Action dated Jun. 2, 2015", W/ English Translation, 6 pgs.
"Japanese Application Serial No. 2014-548776, Office Action dated Nov. 24, 2015", W/ English Translation, 7 pgs.
"Japanese Application Serial No. 2014-548776, Response filed Feb. 22, 2016 to Office Action dated Nov. 24, 2015", W/ English Claims, 13 pgs.
"Japanese Application Serial No. 2014-548776, Response filed Aug. 28, 2015 to Office Action dated Jun. 2, 2015", W/ English Claims, 14 pgs.
"Korean Application Serial No. 10-2015-7019776, Office Action dated Mar. 27, 2017", W/ English Translation, 6 pgs.
"Korean Application Serial No. 10-2015-7019776, Response filed Jul. 27, 2017 to Office Action dated Mar. 27, 2017", w/ claims in English, 17 pgs.
"Korean Application Serial No. 10-2016-7008857, Office Action dated Jun. 21, 2016", W/ English Translation, 6 pgs.

(56) References Cited

OTHER PUBLICATIONS

"Korean Application Serial No. 10-2016-7008857, Office Action dated Dec. 21, 2016", W/ English Translation, 16 pgs.

"Korean Application Serial No. 10-2016-7008857, Response filed Feb. 21, 2017 to Office Action dated Dec. 21, 2016", w/English Claims, 24 pgs.

"Korean Application Serial No. 10-2016-7008857, Response filed Aug. 22, 2016 to Office Action dated Jun. 21, 2016", W/ English Translation, 15 pgs.

"Korean Application Serial No. 2014-7017918, Office Action dated May 21, 2015", W/ English Translation, 5 pgs.

"Korean Application Serial No. 2014-7017918, Office Action dated Dec. 31, 2015", With English translation, 5 pgs.

"Korean Application Serial No. 2014-7017918, Reasons for Rejection dated Mar. 2, 2016", (English Translation), 7 pgs.

"Korean Application Serial No. 2014-7017918, Request for Re-Examination filed Feb. 3, 2016", W/ English Claims, 21 pgs.

"Korean Application Serial No. 2014-7017918, Response filed Jul. 21, 2015 to Office Action dated May 21, 2015", W/ English Claims, 19 pgs.

"Taiwanese Application Serial No. 101148116, Office Action dated Nov. 24, 2014", W/ English Translation, 15 pgs.

"Taiwanese Application Serial No. 101148116, Response filed Feb. 17, 2015 to Office Action dated Nov. 24, 2014", W/ English Claims, 9 pgs.

A, Messer, et al., "SeeNSearch: A Context directed search facilitator for home entertainment devices", Pervasive and mobile computing,Elsevier,NL,vol. 4,No. 6, (Sep. 17, 2008), 871-888 pgs.

Hideki, Sumiyoshi, et al., "CurioView: TV recommendations related to content being viewed", Broadband Multimedia systems and broadcasting (bmsb), 2010 ieee international symposium on, ieee, piscataway, NJ, USA, XP031675515,, (Mar. 24, 2010), 1-6.

Hisashi, Miyamori, "Integrated Search Engine of Web Content and TV Programs", Proceedings [online], Engineering Research Expert Committee of the Institute of Electronics, (Jun. 30, 2006).

Keith, Mitchell, et al., "Social TV", Proceedings of the 8th International Interactive Conference on Interactive tv&video, euroi tv '10, XP055038059, (Jun. 9, 2010), 283 pgs.

Messer, A, et al., "SeeNSearch: A context directed search facilitator for home entertainment devices", Pervasive and Mobile Computing, elsevier, NL, vol. 4, No. 6, 871-888, XP025645582, (Sep. 17, 2008), 871-888.

Michell, Keith, et al., "Social TV: Toward Content Navigation Using Social Awareness", Processing of the 81 li international interactive conference of interactive TV&VIDEO, (Jun. 9, 2010).

"Chinese Application Serial No. 201710872110.0, Voluntary Amendment filed Mar. 12, 2018", w/ English claims, 24 pgs.

"Korean Application Serial No. 10-2018-7007765, Notice of Preliminary Rejection dated Jun. 19, 2018", w/ English translation, 7 pgs.

"European Application Serial No. 11878980.9, Communication Pursuant to Article 94(3) EPC dated Oct. 8, 2018", 9 pgs.

"Korean Application Serial No. 10-2018-7007765, Response filed Aug. 17, 2018 to Notice of Preliminary Rejection dated Jun. 19, 2018", w/ English claims, 28 pgs.

"Korean Application Serial No. 10-2018-7007765, Notice of Preliminary Rejection dated Feb. 14, 2019", w English Translation, 5 pgs.

"Korean Application Serial No. 10-2018-7007765, Final Office Action dated Dec. 27, 2018", w English translation, 7 pgs.

\* cited by examiner

REAL-TIME NATURAL LANGUAGE PROCESSING OF DATASTREAMS

PRIORITY APPLICATION

This application is a continuation of U.S. application Ser. No. 13/992,406, filed Sep. 26, 2014, now issued as U.S. Pat. No. 9,710,461, which is an U.S. National Stage Application under 35 U.S.C. 371 from International Application No. PCT/US2011/067623, filed Dec. 28, 2011, published as WO 2013100978A1, all of which are hereby incorporated by reference in their entireties.

TECHNICAL FIELD

Embodiments pertain to the use of content processing techniques and related software applications. Some embodiments relate to natural language processing of datastreams and digital content information in connection with internet-related applications and services.

BACKGROUND

Natural language processing (NLP) has traditionally been a very processing and storage intensive computing activity. In fact, many types of this activity have been migrated into cloud installations that match NLP with other functions, such as speech-to-text, and provide massive computing and storage resources. However, as client-side performance and local storage have increased, capable systems exist that allow for NLP to be used on local platforms.

Implementations of NLP today are typically provided using languages such as C/C++, reflecting the performance-centric concerns and the ability to tune the code and algorithms to specific hardware and operating system environments. One significant downside is that with multiple hardware and operating system configurations and combinations, there are numerous NLP implementations—which result in a significant task of development, optimization, and support.

DETAILED DESCRIPTION

The following description and the drawings sufficiently illustrate specific embodiments to enable those skilled in the art to practice them. Other embodiments may incorporate structural, logical, electrical process, and other changes. Portions and features of some embodiments may be included in, or substituted for, those of other embodiments. Embodiments set forth in the claims encompass all available equivalents of those claims.

The present disclosure illustrates techniques and configurations to enable content retrieval and delivery, through the use of NLP and dynamic content delivery specifications. In one embodiment, an NLP engine is configured to perform real-time extraction of useful words and phrases from a stream of textual content. An interface to this NLP engine is provided using a standards-based implementation of W3C Hypertext Markup Language specification version 5 (HTML5), EMCAScript-standard scripting (e.g., JavaScript® or JScript), and JavaScript Object Notation (JSON). This interface enables the selection and delivery of content items in a format that is portable across multiple hardware and operating system domains, and does not require specialized programming or compilation for deployment at client-side devices.

Additional techniques and configurations for determining, locating, and providing related content for a user are described herein. These include use of the NLP engine and the HTML5 interface to deliver a second set of content that is related (based on any of a number of relationships) to a first set of content. For example, as a result of locating or presenting a first set of content (such as a video), a second set of content related to the first set (such as another video, or textual content) may be located and presented to the user. In one embodiment, the second set of content is determined by performing NLP on textual language terms and strings provided by the first set of content. For example, a first set of content comprising multimedia video, subtitles, or closed captioning may be provided to the NLP engine, to produce NLP-extracted keywords to determine the second set of content.

In a further example use of an embodiment, a content system is able to determine a stream of text associated with media content items, analyze the stream of text, capture keywords and phrases from the text, and perform additional selection and analysis from the captured text. The NLP engine may then analyze and select language terms of interest. The selected terms may be used in numerous ways including, but not limited to: providing a part of a search query to locate related content; identifying important, persistent user data; analyzing the nature and context of the text payload for context-aware operations and data retrieval; or using as metadata or in connection with mapping to other metadata.

A variety of user interfaces and engine configurations may be used and designed in connection with these NLP techniques. The following disclosure provides a number of use examples and configurations relevant to the content system, an NLP engine, a content interface (presented, for example, with HTML5/JavaScript techniques), content services, and display devices. It will be apparent that features of these embodiments may be provided in a single system or device, in separate devices or subsystems, or in various permutations of hardware or software. Thus, although the use examples provided herein may describe various processing and display elements as operating independently, the various elements are intended to be used in conjunction with each other in certain system or device configurations.

In one embodiment, the related content display and processing environment is provided in connection with software applications such as a web browser implementing JavaScript and dynamic markup language (e.g., HTML5) interpretation. By providing an implementation in a JavaScript/dynamic markup language enabled browser, the content processing elements (such as NLP) may be deployed, in real time, to analyze content text received from associated web services and provide a corresponding related content display. The browser may render and execute these applications through scripting performed within one or more dynamically executed webpages or web applications (web apps). Moreover, this dynamic scripting configuration enables an NLP implementation that may be integrated into any number of webpages or web applications compliant with W3C HTML5/JavaScript standards.

Figure 1:
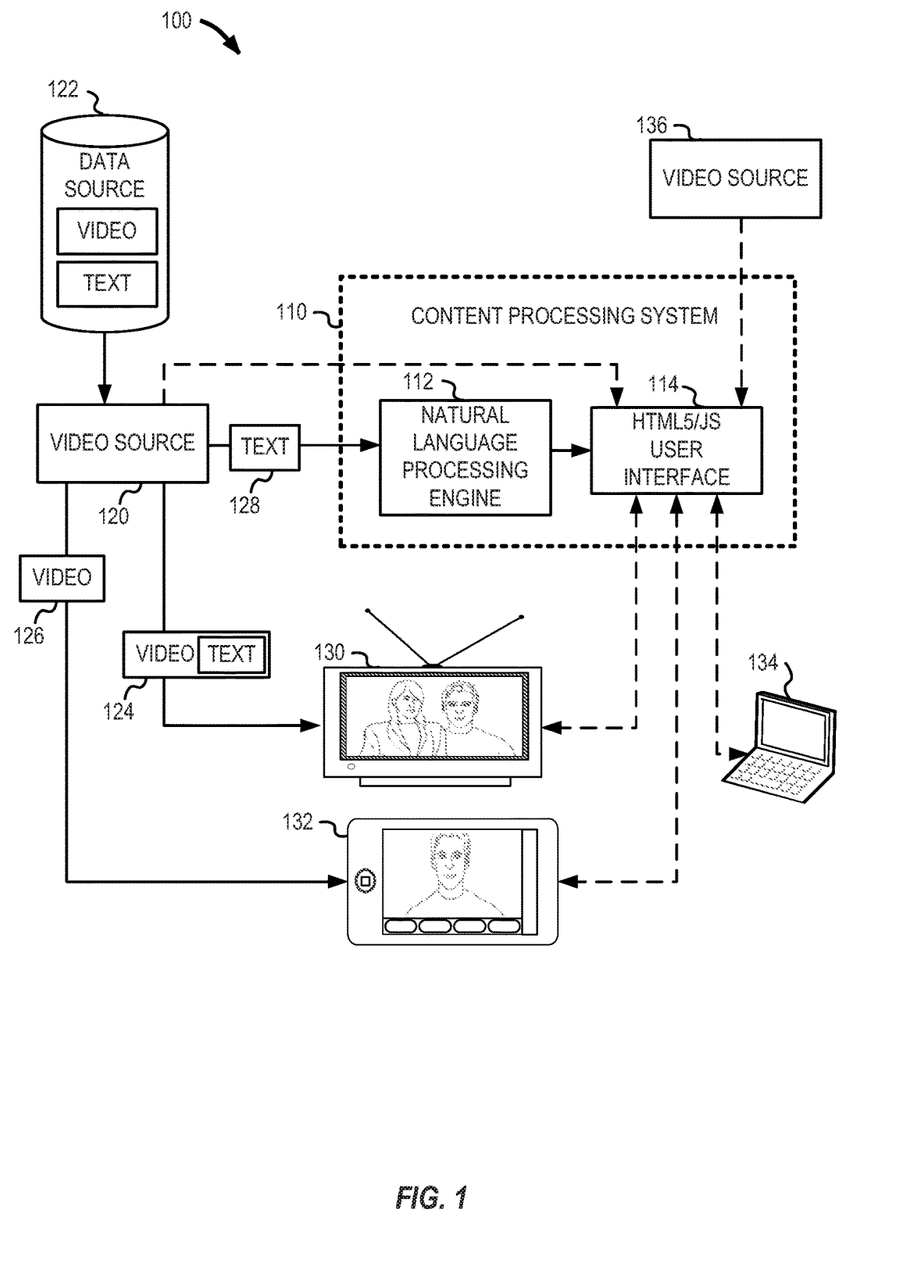
FIG. 1 provides an illustration of a system architecture enabling content display among multiple display devices in connection with natural language processing according to an example embodiment.

FIG. 1 provides an illustration of a content environment 100 providing content among multiple display devices in connection with natural language processing, according to an example embodiment. Specifically, content environment 100 illustrates the use of a content processing system 110, which includes an NLP engine 112 and an HTML5/JavaScript capable user interface (UI) 114. The content processing system 110 is configured to provide additional relevant content to users in response to processed textual content, as illustrated in the following configuration.

A video source 120 obtains video and text content from a data source 122, provides video content 124 and 126 to receiver devices television 130 and mobile device 132 respectively. The video content 124 is illustrated as containing textual data related to the video data provided, such as text subtitles or closed captioning data corresponding to the video data. The video content 126 is illustrated as only containing video data.

The video source 120 also provides the textual content 128 corresponding to the video data to the content processing system 110. The content processing system 110 processes the textual content 128 with the NLP engine 112 to derive relevant keywords, terms, phrases, and other natural language concepts into relevant natural language data. The NLP engine 112 then provides the relevant natural language data to a user interface, such as the HTML5/JavaScript UI 114.

The HTML5/JavaScript UI 114 is configured to obtain additional video content based on the relevant natural language data derived by the NLP engine 112. This relevant natural language data may include the text of a concept or one or more keywords related to the video content 124, 126 provided from video source 120, as text corresponding to audio of the video content (e.g., closed captioning text or subtitles).

Alternatively, the textual content 128 provided to the content processing system 110 may relate to the video content but not directly correspond to audio of the video content. For example, if the video content 124 provided to the television 130 is a movie starring a particular actor, textual content 128 received from the video source 120 may include metadata associated with the movie. The metadata fields may be processed by the NLP engine 112, to extract relevant key terms, such as the actor's name, the description and genre of the movie, or pre-determined information about the content. The NLP engine 112 may extract key terms used to perform a search, for example, to locate relevant additional content such as movies in the same or similar genre including the same actor. Further, the actor's name may be used to determine other types of multimedia content (including other movies, reviews and news regarding the actor and the movie, movie clip previews and trailers, actor interviews and promotional materials, and the like). These searches may be conducted by the content processing system 110, for example, within a dynamic website or web application facilitated and rendered by the HTML5/JavaScript UI 114.

Upon determining the key terms, the HTML5/JavaScript UI 114 may provide the ability for the user to conduct the search with the key terms, view the results of the search, and select the results of the search. For example, user selection of a result from the search may cause a particular video content available from the video source 136 to be presented for display. This related content may be presented for display in the HTML5/JavaScript UI 114, or streamed to one of the display devices (e.g., the television 130, the mobile device 132). Portions or all of these operations may be automated, for example, to automatically perform relevant searches, or to automatically obtain and display the related content.

Thus, the video source 120 may provide textual content derived from any number of sources or formats, including closed captioning, subtitles, transcriptions and scripts, metadata, reviews and summaries, user generated content, and the like for use with the NLP engine 112. Likewise, the content processing system 110 may be configured to obtain additional textual content from external sources based on textual data or keywords provided by the video source 120 (for example, by obtaining a transcript of a video program from an internet service when being provided textual metadata identifying the video programming streamed to the display devices (e.g., the television 130 or the mobile device 132)).

The content processing system 110 may locate and produce related content from any variety of sources, including publicly accessible websites, internet content services, subscription media providers (including telephone, wireless, or cable content services), or other electronic data sources. Thus, the video source 136 is shown as optionally providing this related content; this related content may also be provided from the source of the first content, the video source 120. The video source 120 is not necessarily limited to a networked video source, however, as a variety of over-the-air or locally-processed sources (e.g., a DVD or Blu-Ray player) may originate the content from the data source 122 in a digital or analog format.

The HTML5/JS UI 114 may be accessed or embodied in any number of user-operable devices and settings, and in remotely or locally executed applications. For example the HTML5/JS user interface 114 may be offered as an on-screen application within the television 130; the HTML5/JS user interface 114 may be offered in connection with a standalone application installed on the mobile device 132; the HTML5/JS user interface 114 may be accessed by a web browser operating on a computing device 134.

The content processing system 110 may be provided by a remote service serving the HTML5/JS user interface 114 over a network. The content processing system 110 may alternatively be provided by applications. components, or modules performed by a client-side hardware device, such as a client device coupled to a display screen (e.g., a set-top cable box or video receiver connected to a television), or by software implemented in one or more computing systems. Further, aspects of the content processing system may be performed directly using processing hardware on the display device (such as an internet-connected television, or a smartphone/tablet computing device).

Various application programming interfaces (APIs) may be provided by, accessed by, or otherwise used in connection with the content processing system 100. For example, the content processing system 100 may provide an API configured to receive textual content from the video source 120 or from the display devices (e.g., the television 130, the mobile device 132), with the textual content corresponding to the video being displayed on the display devices (for example, being provided at the start or resumption of a video program). Returning to a previous example, a television's closed-caption/subtitle information may be cloned from the video broadcast feed and provided to the content processing system 110 for real-time processing. The television in this scenario may operate as a server, to transmit a real-time datastream of the text to the content processing system 110 operating on another device (such as an internet-connected tablet PC that is operable in the same environment as the television, the tablet PC providing a user-operable graphical user interface that enables a user to learn more about the video content being displayed).

In one embodiment, the content processing system 110 processes the text stream using JavaScript and HTML5 constructs, by use of a native HTML5/JavaScript application which renders the user experience, handles input/output (I/O) operations, and the like. Thus, portions or all of the content processing system 110, including the NLP engine 112, the HTML5/JS UI 114, and other components, may be provided through a lightweight web-based application executing applicable components in a dynamic scripting environment. Features of such an HTML5/JavaScript UI 114 may be executed on any combination of display devices (e.g., the television 130, the mobile device 132), or computing device 134.

Figure 2:
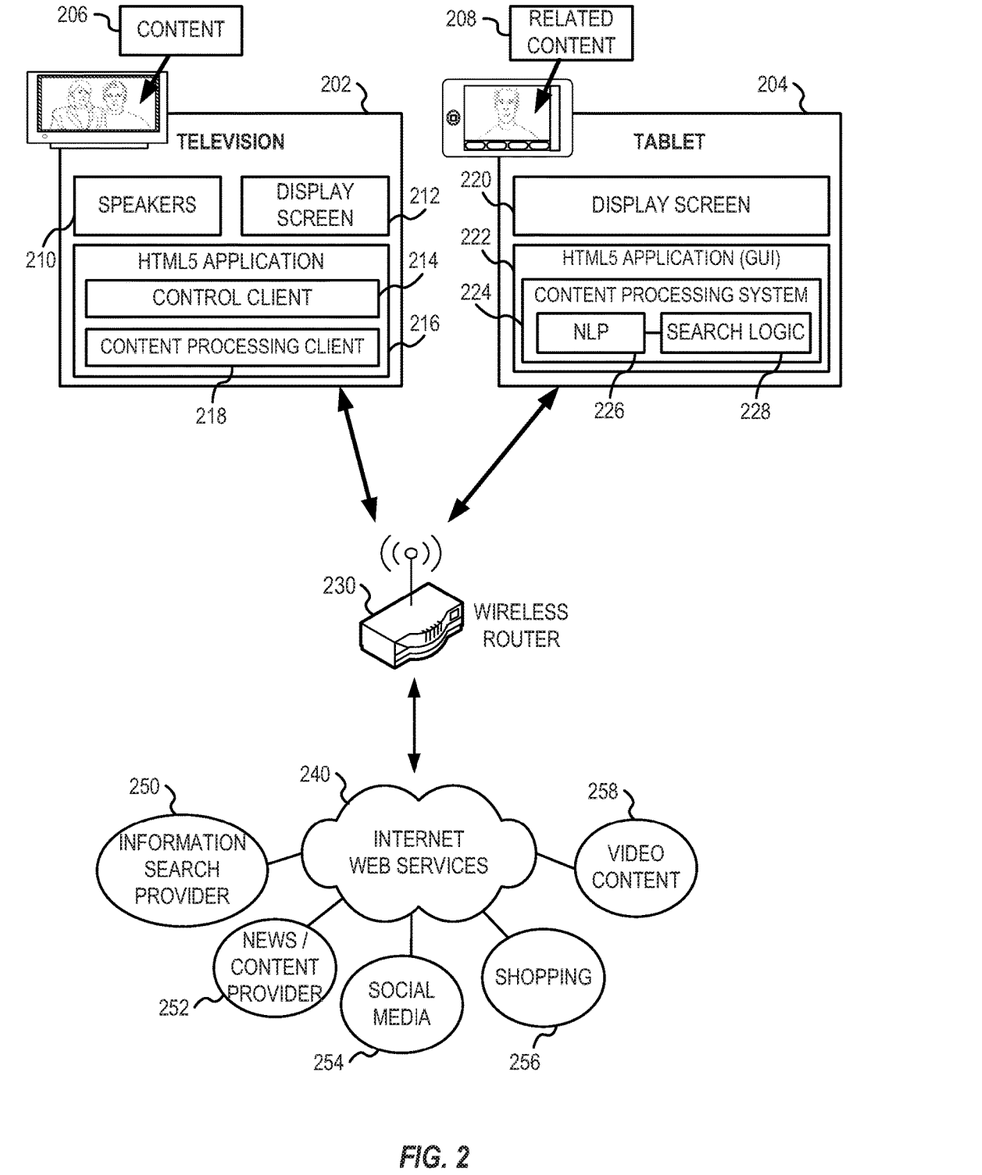
FIG. 2 provides an illustration of a device architecture for devices providing content and related content displays according to an example embodiment.

FIG. 2 provides an illustration of a device architecture for devices providing content and related content displays in connection with natural language processing according to an example embodiment. Specifically, a television 202 and a tablet 204 devices are configured for displaying content 206 and related content 208, respectively. In the illustrated example, the related content 208 is related to content 206, and serves as a display of additional or supplemental content, which is related to content 206, that may be of interest to the user.

As shown, the television 202 provides audio speakers 210 and a display screen 212 for output of the audio and video respectively associated with the content 206. The television 202 is further configured for operation of an HTML5 Application 216, which may be provided in connection with a graphical UI (not shown). The HTML5 Application 216 may comprise a web browser, a standalone application, or a like set of instructions executed on the television to provide content functionality.

The HTML5 Application 216 further provides a control client 214 and content processing client 218. The control client 214 may be configured to receive commands in connection with a content processing system 224, for example, to provide a different set of content or perform some user-directed activity in response to commands received from the content processing system 224. The content processing client 218 may be configured to provide certain content information to the content processing system 224 (for example, closed captioning text of the content 206 being provided on the television 202, or metadata associated with the content 206).

As further shown, the tablet 204 provides a display screen 220, and may provide an audio output using speakers (not shown). The tablet 204 is further configured for operation of an HTML5 Application 222, specifically a web browser, a standalone application, or a like set of instructions executed on the tablet to provide content functionality for a content processing system.

Specifically, the HTML5 Application 222 may comprise a web browser providing a scripting environment for executing functions of a content processing system 224. The functions of the content processing system 224 may include NLP 226, and search logic 228, initiated within and potentially performed within the HTML5 Application 222. For example, a web browser providing a scripting environment may be configured to execute scripting commands in connection with a script-enabled NLP engine.

Communications between the television 202 and tablet 204 may be facilitated by a local area network (LAN), such as a wireless network facilitated by a wireless router 230. For example, the television 202 may communicate data including textual and metadata content over the LAN to tablet 204, such as to provide a real-time textual transcription associated with content 206. The content processing system 224 of tablet 204 may function to receive and process this data (using the NLP 226), and initiate various queries with search logic 228 to locate and retrieve the related content 208.

The related content 208 may be retrieved from any number of content sources local or remote to the user. As illustrated, a connection to internet web services 240 is provided through wireless router 230, with potential internet web services for the related content 208 including an information search provider 250, a news or dynamic content provider 252, a social media source 254, a shopping information source 256, and a video content source 258. The related content 208 may be provided from one or several of these sources. For example, related content 208 may be provided by an internet-streamed video obtained from video content source 258, determined as a result of performing NLP on closed captioning keywords originating from the display of content 206 on television 202.

As illustrated in FIG. 2, a display of the related content 208 occurs on the tablet 204, and a display of the content 206 occurs on a separate device (the television 202). It will be understood that the display of the related content 208 may occur on the same device as the original content at the same or later time, for example, using picture-in-picture displays, screen overlays, or like display techniques.

An API may be provided by the content processing system 224 in order to receive communications from the television 202. For example, a closed caption text stream may be transmitted to the tablet 204 because the television 202 is configured to connect to the tablet 204, receive and transmit messages with the tablet 204, and disconnect the connection when the connection is no longer needed. The messages exchanged between the television 202 and tablet 204 may comprise any number of formats.

In one embodiment, the textual data is provided to the content processing system 224 in a JSON-parsable format for use in the HTML5 applications 214, 222. For example, the format of textual content may be provided as follows:

{meta: 'title'|'transcript'|'tags'|'summary', content: 'some text'|['tag1', 'tag2', . . . ]}

In this example format, the value 'title' may provide a title for the video content; the value 'transcript' may provide a partial or complete transcript of text for the video content; the value 'tags' may provide one or more textual tags or keywords associated with the video content, the value 'summary' may provide a textual summary of the video content for reading by a user; the value 'some text' in 'content' may provide an indication of textual content; and the array containing 'tag1', 'tag2' may provide a list of data terms or phrases used to obtain additional content.

Providing the textual data within a JSON format enables a JavaScript/EMCAScript comprehending platform to receive and interact with the textual content associated with the video content. The structure and syntax within JSON makes it easy for applications to understand what they are receiving and use the payload appropriately. Thus, various components of a content processing system such as an NLP engine and HTML5/JS UI implemented in software may be configured to process, use, and display results of such data.

For example, a content processing system may provide an extractor or other text parsing component to parse the JSON-format strings, and determine relevant metadata and transcript lines related to the subject content. Prior to display of the content, keywords may be extracted from metadata such as program tags or titles to determine contextual keywords. For transcript text (e.g., closed captioning or subtitle) that may be received one line at a time during the display of the content, a content processing system may queue this information as it is received, and build larger useful and relevant phrases from which related information may be located and determined.

The following NLP techniques may be implemented using JavaScript and a JavaScript-based NLP engine. It will be evident that variations to the following described NLP techniques may be implemented in connection with an NLP engine deployed in a content processing system.

To obtain proper context for terms in the textual data, part of speech tagging may be applied to the textual data. For example, part of speech tagging may be used to tag (assign parts of speech to) the words in lines of transcript. As described below, there are a number of approaches to parts of speech tagging that may be used in conjunction with the presently described NLP configuration.

One non-limiting example of a software application usable for automated text tagging operations is EngTagger (English Part-of-Speech Tagger Library, an open source software project distributed by RubyForge), a probability based, corpus-trained tagger that assigns part of speech tags to English text based on a lookup dictionary and a set of probability values. EngTagger provides portability for use with JavaScript, and therefore may be integrated in connection with the presently described HTML5/JavaScript operating environments.

One type of tagging that may be performed in connection with NLP includes unigram tagging. Unigram tagging uses a single piece of information (generally a single word) to decide the most probable tag for association, by lookup in a lexicon. Given a corpus, a lexicon may be created for each word in the corpus, resulting in words with a count of the number of times the word occurs as a particular part of speech in the corpus. For example, "Peter" might be tagged 110 times as a proper noun in the corpus; while words like "let" might be tagged as a noun 10 times and as a verb 83 times. From this information, parts of speech may be assigned to a sentence.

To assign parts of speech with unigram tagging, the sentence first has to be broken up into individual tokens (for example, with the use of a tokenizer). Then the text is run through a tagger performing unigram tagging. A result of unigram tagging for a sentence may, for example, be formatted such as:

I/PRP walked/VBD the/DET dog/NN this/DET morning/NN before/IN work/NN ./PP

The set of tags may be defined according to some standard. A subset of possible tags, provided for illustration and not limitation, include: PRP=determiner, possessive second; VBD=verb, past tense; DET=determiner; NN=noun (singular); IN=preposition or conjunction; PP=punctuation, sentence terminator.

Another technique for use with tagging in NLP involves the use of bigram tagging. This form of tagging is used to add more "intelligence" to the algorithm: rather than just applying the most probable part of speech (from the set of possible parts of speech the word might belong to), the probability is determined with respect to the preceding tag. Thus, the most probable tag for a word is actually "the most probable tag, given the tag on the previous word was X".

To perform bigram tagging, a second data set may be used to represent probabilities of a transition from one tag to another. These probabilities may be derived by training the tagger on the tag sequences in the corpus. A tag transitions data set, for example as provided from the EngTagger library, may be used by the NLP engine. The NLP engine may combine this data set with the original tag probability set, and apply both data sets to a textual sentence. This technique may be used in connection with a modification of the Viterbi algorithm to improve the tagging accuracy.

A variety of other tagging models and examples exist that may be used in conjunction with NLP processing. These include tagging by comparison to regular expressions; tagging in combination with transformation rules; tagging based on likely tag sequences; and other models. Any number of simple or extensive approaches may be used for the NLP techniques in connection with the content processing systems and clients implementing an HTML5/JavaScript UI.

Responsive to tagging the text, sequences of particular terms, such as one or more singular or plural proper nouns, may be identified. For example, sequences may be performed by looking for sequences of NNP (proper noun, singular) and NNPS (proper noun, plural) tags, with optional conjunctions (e.g., "and") or prepositions (e.g. "of") between the proper nouns. Other techniques may be used in connection with advanced implementations of chunk parsing methods.

Techniques other than keyword tagging may be used to obtain the context and importance of keywords and phrases in textual sequences. These may include, for example, factoring a count of the number of times each sequence occurs within the whole transcript, to help decide whether a phrase is "important" within the transcript.

The previous tagging techniques generally describe one approach of enabling free indexing in an NLP environment. Free indexing enables processing of any text, but may obtain a number of irrelevant terms, or conversely ignore relevant related terms (for example, "notebook" and "laptop" being treated as different key phrases even though they are synonyms). One approach to improve the suitability of indexing is known as "controlled indexing", which maps known phrases to index terms (e.g. "notebook" and "laptop" could trigger a single key shared phrase, "laptop").

Once a key phrase has been extracted, the NLP engine may be configured to notify new key phrases to listeners or perform other suitable processing in connection with the terms. For example, a text extractor may be configured to initiate a "newKeyPhrase" event from the content processing system as a result of the new key phrase, as well as a "keyPhraseCounted" event for every key phrase encountered. Event listeners may be configure to listen for the occurrence of these text processing events, in order to respond with suitable actions such as performing search queries and providing user prompts. Observers of the events may decide to use the information or ignore it. Thus, in such an embodiment, finding potential keywords and search queries is performed independently from selecting which queries to provide to search sources.

Further enhancements may include adding more data to the key phrase events. For example, in conjunction with NLP, for example, a content processing system may look for named entities in the text, and mark any key phrases with a classification (e.g. "place". "person", "organization"). Other context-based terms may be added during NLP.

Although performing NLP may detect a variety of key phrases and terms that are potentially relevant, in a content-rich environment, not all of the terms and phrases detected by an NLP system may be suitable or desired for the location or retrieval of content. Thus, additional selection criterion may be used by the processing system to determine whether to use identified key terms and phrases for search queries for locating or retrieving content.

For example, query selection may use a range of filters to decide whether a key term or phrase is worth using as a search query. To help make this decision, the query selector may factor: the key phrase; a number of times that key phrase has occurred in the transcript or textual listing; and content provided by the current program, which in turn (by default) contains: all the search results found so far; any documents generated from the search results (including stemmed versions of the text and counts for each stem); any previous queries searched for; and the whole transcript or textual listing so far. Multiple filters may be applied in parallel to decide whether to select a key phrase as a query.

The content processing system may be configured to track key terms and phrases already used as searches (including searches to obtain the original content), so that the same key phrase is not searched for more than once. A weight may also be applied to each candidate key (noun) phrase. For example, such a weight may be established from:

number of occurrences*(number of words in phrase*number of words in phrase)

The content processing system may be configured to only search phrases with a weight above some configurable value, for example, equal or greater than 3. Such a value might require that a single word proper noun phrase has to occur three times to be looked up; while a two word noun phrase only has to occur once. This approach produces reasonable results, especially on "entity rich" text, such as non-fictional transcripts of content.

Query selection may also benefit from structure in the potential queries, e.g., the key phrases produced by NLP. In further embodiments, named entity extraction and chunk parsing for elements outside of proper nouns may be used in connection with NLP techniques.

An NLP technique may also attempt to obtain context when choosing key phrases. For example, by analyzing key phrases from the NLP engine to determine which phrases overlap in part or in whole from previous search terms, the NLP engine may be able to derive context of the phrases. This would create linkages and threads throughout multiple streams of phrases (or content items) and identify common context among them. Such a technique may be applied when analyzing multiple sets of content (a documentary series, for example) and identifying themes in user interest to establish a typical range of definitions for words and phrases. For example, words that are used repeatedly in a segment may be associated with some context, for instance "bass" as a "bass guitar" in a music documentary, versus the term "bass" as used in a "bass fish", which might be used in a nature documentary.

A variety of use cases may implement the presently described natural language processing techniques to determine related content from one or more sources. In contrast with a content search engine that is trying to find a "best match" of content to a single keyword, the presently described NLP techniques may be adapted to provide sets of useful and interesting related content for the user, based on the context of the content from multiple keywords. When trying to locate "related" content, the NLP techniques may be used to identify tangentially related concepts—concepts that would not necessarily be obtained from a simple keyword searching of the most frequently used word. Determining the context of the content within a genre or other larger content categorization allows NLP techniques to be particularly valuable for media having shifting context (for example, in news video programs providing multiple content segments).

For example, in the presentation of a news video program content, the context of the video may be determined in connection with a subtitle or closed caption text. Likewise, textual data which describes the program, or Moving Picture Experts Group (MPEG) format metadata associated with the program, may be used as a textual source to determine context. The context of the media may be determined prior to viewing the program from the genre/description of the program, for example. The NLP techniques may also be used to determine potential queries of key terms across content and social media sites such as Twitter, Flickr, Wikipedia, and the like, to determine further relevant content or user-driven activity. These queries may be integrated within the HTML5/JS interface to dynamically obtain and deliver content.

The related content determined as a result of NLP may be provided in any number of forms or formats, with any combination of manual or automatic functionality. For example, related content may include search results of similar types of content; user prompts to conduct searches or visit websites; relevant advertisements; relevant user interactivity displays and feature interactions; and related metadata interactions.

Figure 3:
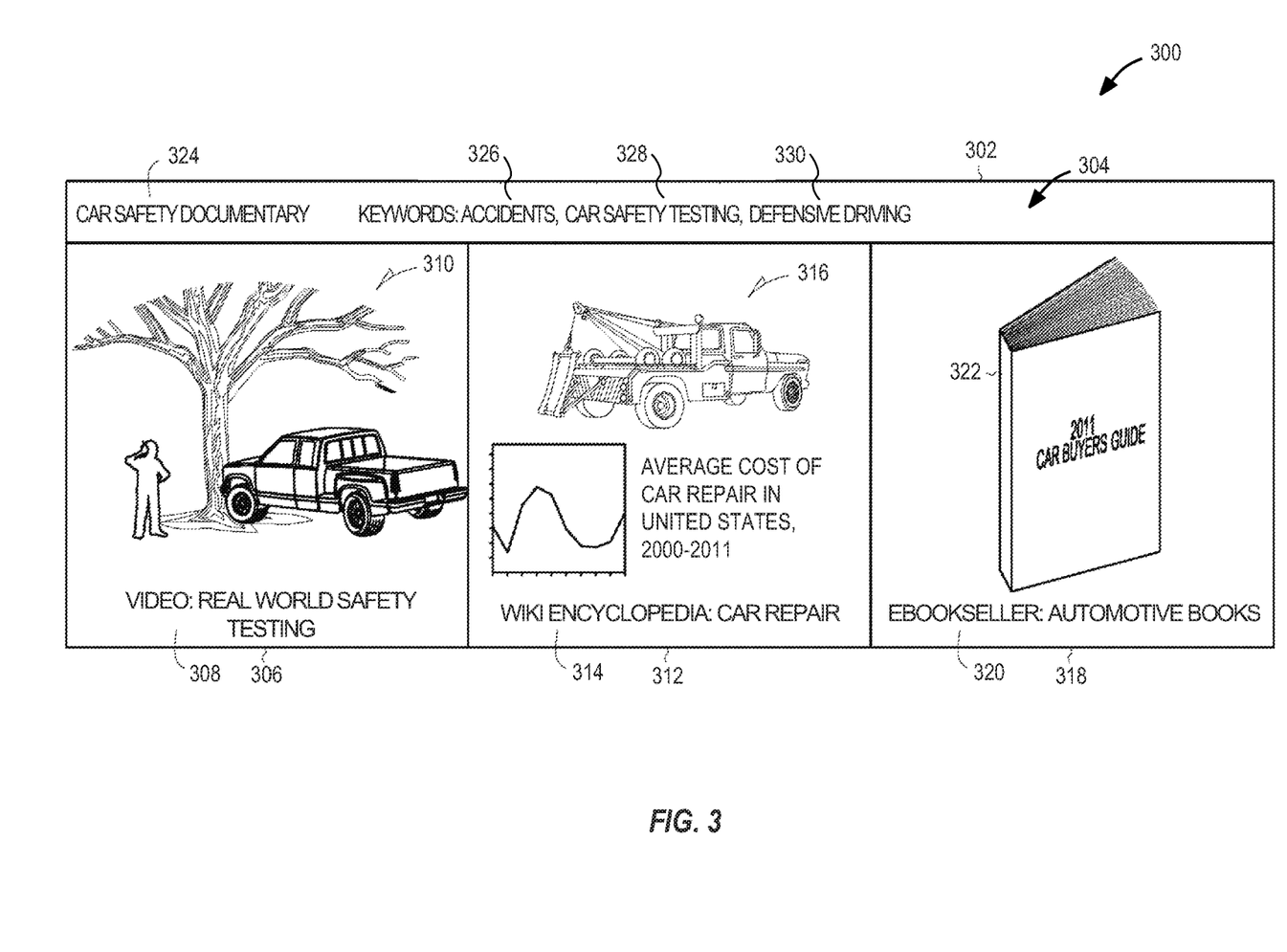
FIG. 3 provides an illustration of an HTML5/JavaScript-enabled graphical user interface configured to provide related content for a user using natural language processing according to an example embodiment.

FIG. 3 provides an illustration of an HTML5/JavaScript-enabled graphical user interface window 300 enabled to provide related content for a user, based on related content determined in connection with natural language processing according to an example embodiment. As shown, graphical user interface window 302 includes title panel 304 and display panels 306, 312, and 318. Each of the display panels 306, 312, 318 provides a graphical display of some related content from various sources, with the particular related content display determined as a result of keywords derived from NLP.

For example, when a user is watching a car safety documentary (noted by a title 324), a variety of keywords may be derived from textual content associated with this documentary program, such as closed captioning, subtitles, and programming metadata. As the program is viewed, and a stream of text is obtained, various key terms words and phrases occurring in the text (such as accidents 326, car safety testing 328, defensive driving 330) may be derived. The key terms 326, 328, 330 may be context sensitive, for example, because the term "car" and "automobile" are synonymous, and "defensive driving" refers to a human activity occurring in connection with a motor vehicle that has nothing to do with "offense" or motor sports.

The key terms 326, 328, 330 may be displayed for user input and interacted with directly to display the related content, for example, by a cursor selection of one or more of the keywords. Alternatively, the keywords may be used to automatically generate content or content links in one or more of the display panels 306, 312, 318. The display panels show that although the common theme of the original content is a car safety documentary, related topics such as "safety testing", "car repair", and "car purchasing" may be related content of interest to the user.

Specifically, panel 306 provides an illustration 310 and a description 308 of a video, such as from a social media service, which may be selected by the user. Panel 312 provides an illustration 316 and a description 314 of an online encyclopedia entry (such as a snapshot or excerpt of content), which may be selected by the user. Panel 318 provides an illustration 322 and a description 320 of goods or services which may be purchased by the user, such as from an online bookstore.

Each of the panels 306, 312, 318 may be used to provide enhanced illustrations in the form of video, animations, logos, and other dynamic content. The user interaction accepted by the user interface window 302 illustrated in FIG. 3 may comprise any number of forms, such as on-screen selection, navigation buttons, keyboard or voice commands, and the like. Further, the user interface illustrated in FIG. 3 may be provided in a portable mobile computing environment such as a tablet computer, and adapted to receive user touch commands and gestures to navigate and select related content of interest.

Figure 4:
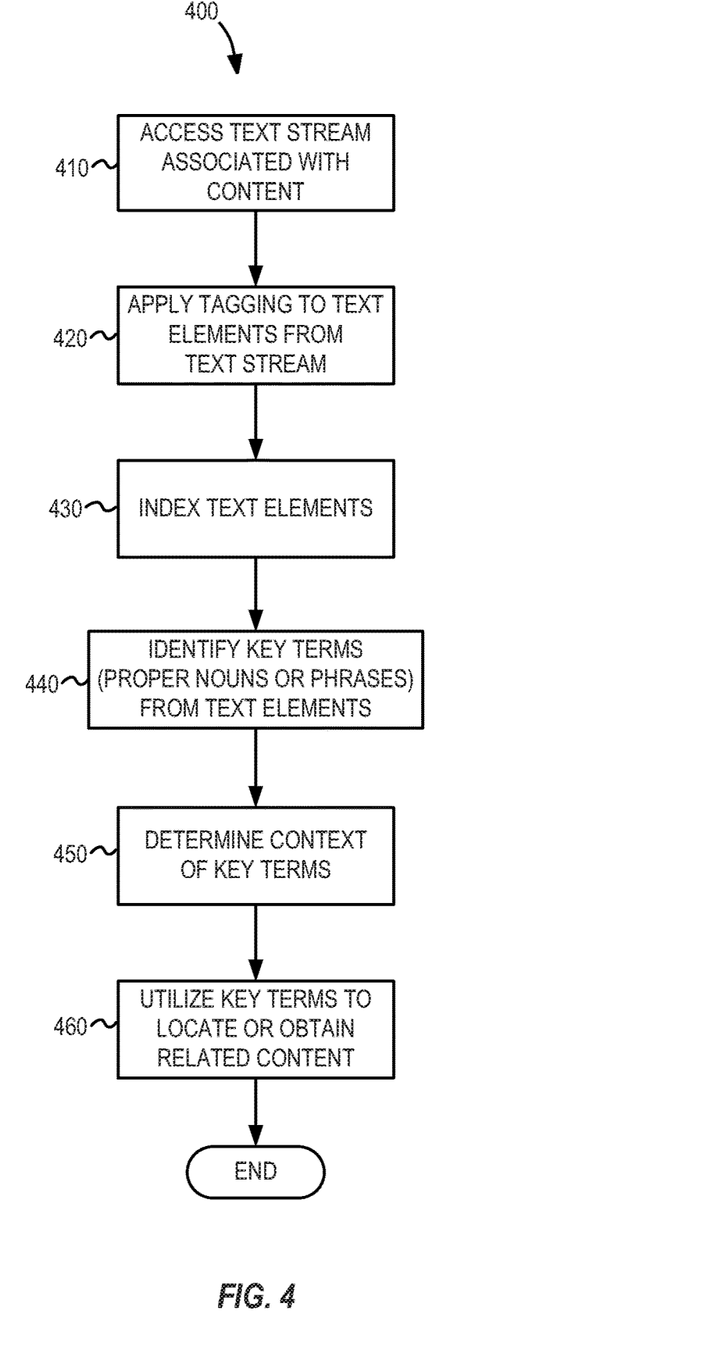
FIG. 4 provides a flowchart illustrating a method for natural language processing of textual data provided by a multimedia data stream according to an example embodiment.

FIG. 4 provides a flowchart illustrating a method 400 for natural language processing of textual data provided by a multimedia data stream according to an example embodiment. The performance of this process 400 may occur in whole or in part with the previously described content processing system and NLP engine.

As illustrated in operation 410, a text stream associated with content is accessed for NLP. This text stream may be provided by a media device (for example, during the playback of certain multimedia content) to a content processing system, or may be retrieved by the content processing system from some data source. The text stream may be provided directly or indirectly to the NLP engine for instant or delayed processing.

In operation 420, tags and tagging techniques are applied to text elements from the text stream. For example, the in-gram tagging techniques previously described may be applied by an NLP engine to associate tags with articles of speech from the text. In alternative embodiments, the text stream provided to the NLP engine may be partially or wholly tagged prior to processing.

In operation 430, text elements are indexed by the NLP engine, based on article of speech tagging or other indexing criteria. For example, the indexing may identify the number of occurrences for text elements tagged as proper nouns. The results of the indexing may be used in operation 440 to identify key terms, such as proper nouns or phrases, from the text elements. For example, key terms may be identified as text elements occurring at a predefined frequency (or exceeding some determined number of occurrences) as indicated by the indexing of operation 430.

In operation 450, the context of the key terms is identified. For example, certain key terms may be synonyms or antonyms of each other; context-sensitive text processing may be used to determine the proper context for locating related content, and to eliminate, consolidate, or augment key terms. Further, context information may be derived from the key terms in order to identify what type of content (for example, a certain content type such as video or audio) is most related and relevant to the original content providing the text stream. A variety of processing algorithms may be used to locate and derive the context and determine which key terms are most valuable.

In operation 460, the key terms are used in connection with operations to locate or obtain related content. For example, the key terms may be used in connection with internet searches from content providers, in order to offer and stream additional related content. Various listings and recommendations of content may also be obtained with the key words, to provide a user with the ability to further select and stream content. The location, retrieval, and display of the related content may occur in an HTML5/JavaScript compliant environment as further described herein.

Figure 5:
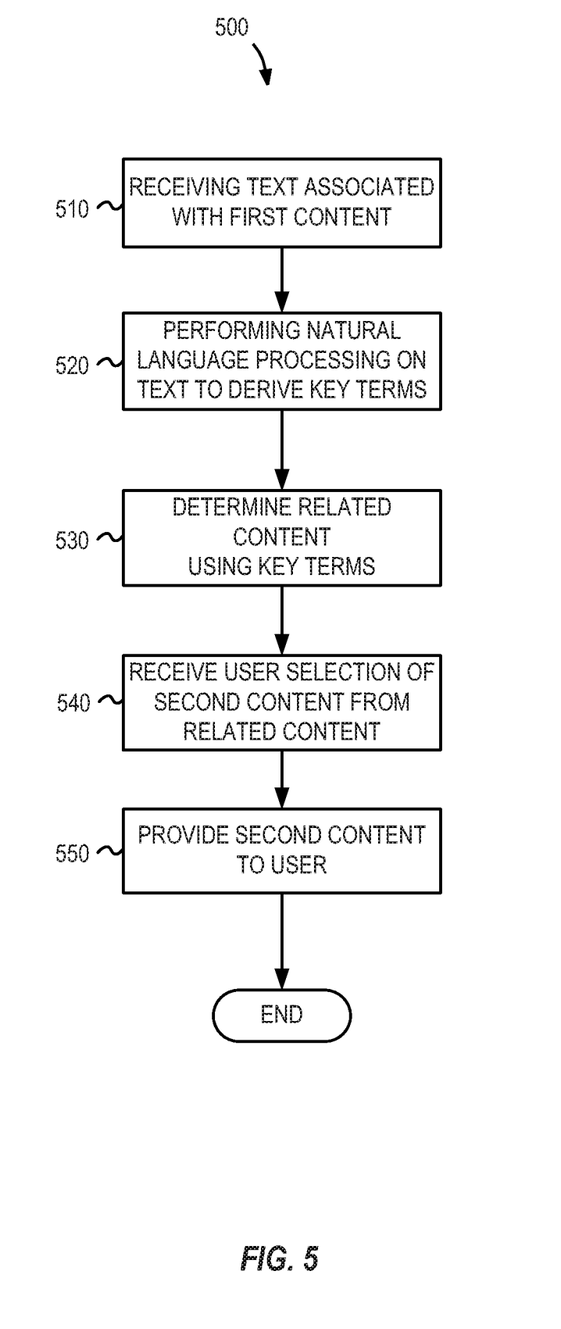
FIG. 5 provides a flowchart illustrating a method for determining related content using content terms provided by natural language according to an example embodiment.

FIG. 5 provides a flowchart illustrating a method 500 for determining related content using content terms provided by natural language according to an example embodiment. As illustrated in operation 510, text associated with first content is received for processing. This text may be provided by a device in connection with one or more APIs. or this text may be retrieved by a processing system in response to notification or detection of some first content.

In operation 520. NLP (for example, as performed in the process illustrated in FIG. 4) is performed on the text associated with the first content. The natural language processing derives key textual terms such as words and phrases useful to the determination of related content.

Operation 530 is performed to determine related content using the key textual terms. Related content may be provided in connection with a textual index accessible by the processing system. Related content may also be provided in connection with a search service accessible by the processing system, with queries to the search service provided using the key terms.

In response to the performance of operation 530, related content such as a related content item or a group of related content items is determined. In some embodiments, further user selection may be processed before proceeding with the display or use of the related content, such as from the result of presenting a list of potential related content to the user. In operation 540, user selection is received to select the second content from the related content. In one embodiment, the user selection is pre-established in the form of preferences, causing the automatic delivery or display of the second content based on the preferences. In another embodiment, a UI (or prompts within a UI) is provided to accept the user selection of the second content.

Finally, in operation 550, the second content (which is related to the first content) is provided to the user. The second content may be provided to the same display or media output as associated with the first content; or alternatively the second content may be provided to a different display or media output as associated with the first content. For example, if the user is displaying the first content on a television, the second content may be provided for simultaneous or later display on the television; or the second content may be provided for simultaneous or later display on a mobile device operating independent of the television.

The previously described techniques may be performed in conjunction with any number of processing systems and devices, and are not limited to the configurations or algorithms of language processing described herein. The textual content may also be obtained from content independent of a textual stream of data. For example, the text associated with video content may be obtained by a combination of any number of automated techniques, including voice and speech recognition, optical character and image text recognition, and machine-implemented language translation.

Although some of the previous examples were provided with reference to multimedia video content such as television programs, the processing performed on such content in connection with the present techniques may extend to a wide variety of single-media and multimedia data and formats. This may include three-dimensional (3D) display content (such as 3D video); textual content (such as electronic books, articles, and other publications); static visual content (such as photos); and audio content (such as music and radio). Further, the related content located and provided to a user may be in a different format than original content located and provided to a user (such as providing video related content in response to original textual content, and vice versa). Moreover, the NLP and user interface techniques may be configured for operation with any number of electronic devices capable of displaying, facilitating, or outputting content (in video or audio form, or otherwise) to users.

Other applicable network configurations may be included within the scope of the presently described communication networks. Although examples were provided with reference to a wireless local area network configuration and a wide area internet network connection, it will be understood that communications may also be facilitated using any number of personal area networks, local area networks (LANs), and wide area networks (WANs), using any combination of wired or wireless transmission mediums.

Embodiments may be implemented in one or a combination of hardware, firmware, and software. Embodiments may also be implemented as instructions stored on at least one computer-readable storage device, which may be read and executed by at least one processor to perform the operations described herein. A computer-readable storage device may include any non-transitory mechanism for storing information in a form readable by a machine (e.g., a computer, smartphone, electronic device). For example, a computer-readable storage device may include read-only memory (ROM), random-access memory (RAM), magnetic disk storage media, optical storage media, flash-memory devices, and other storage devices and media. In some embodiments, the electronic devices and computing systems described herein may include one or more processors and may be configured with instructions stored on a computer-readable storage device.

Figure 6:
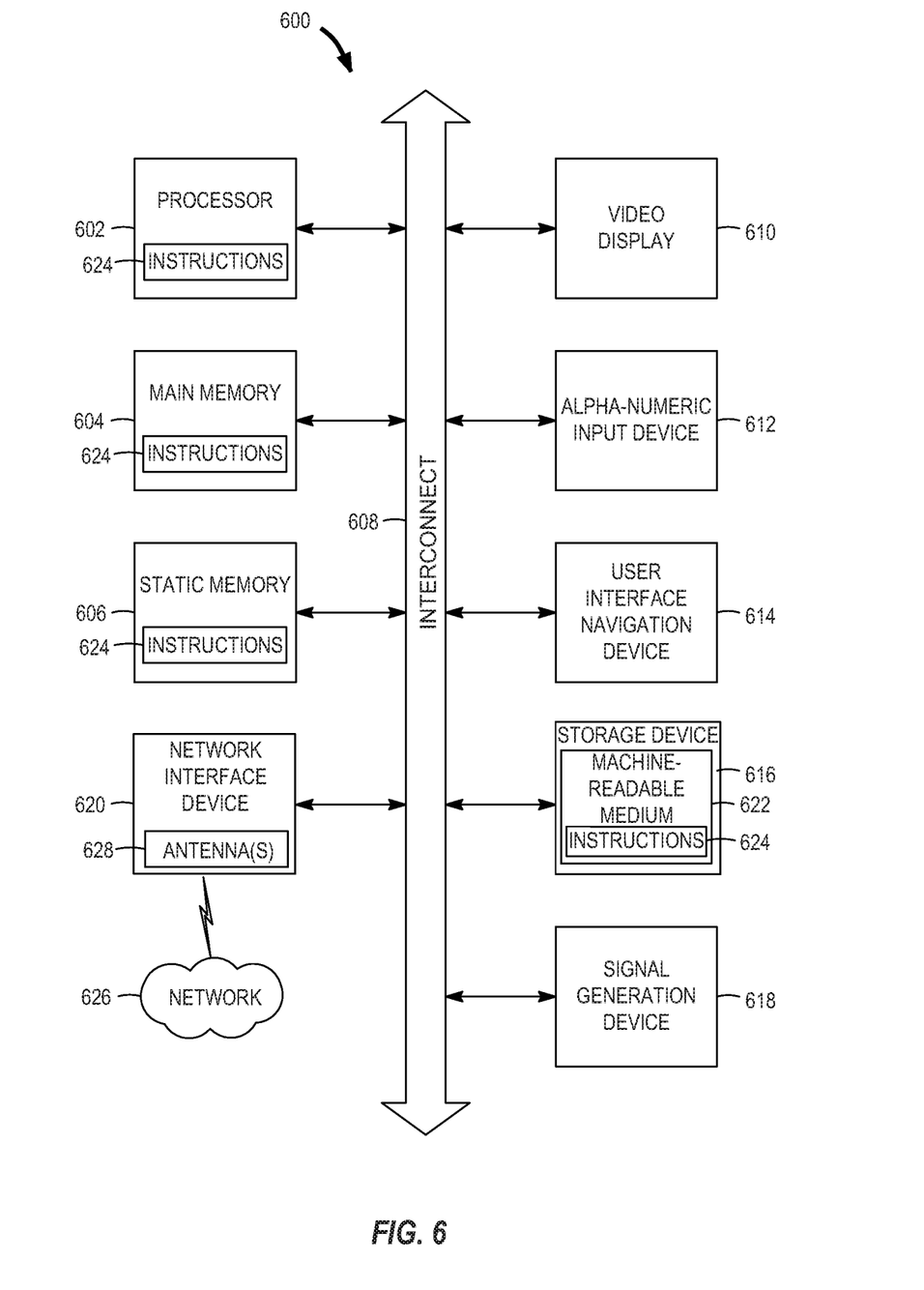
FIG. 6 provides a block diagram illustrating an example machine upon which one or more embodiments can be implemented.

FIG. 6 is a block diagram illustrating an example machine upon which any one or more of the methodologies herein discussed can be run. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes a processor 602 (e.g., a central processing unit (CPU), a graphics processing unit (GPU) or both), a main memory 604 and a static memory 606, which communicate with each other via a bus 608. The computer system 600 can further include a video display unit 610, an alphanumeric input device 612 (e.g., a keyboard), and a UI navigation device 614 (e.g., a mouse). In one embodiment, the video display unit 610, input device 612, and UI navigation device 614 are a touch screen display. The computer system 600 can additionally include a storage device 616 (e.g., a drive unit), a signal generation device 618 (e.g., a speaker), a network interface device 620 (which may include or operably communicate with one or more antennas 628, transceivers, or other wireless communications hardware), and one or more sensors (not shown), such as a global positioning system (GPS) sensor, compass, accelerometer, or other sensor.

The storage device 616 includes at least one machine-readable medium 622 on which is stored one or more sets of data structures and instructions 624 (e.g., software) embodying or utilized by any one or more of the methodologies or functions described herein. The instructions 624 can also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" can include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 624 can further be transmitted or received over a communications network 626 using a transmission medium via the network interface device 620 utilizing any one of a number of well-known transfer protocols (e.g., HTTP). Examples of communication networks include a LAN, WAN, the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Example 1 includes a device, comprising: at least one processor; and at least one memory device having a plurality of instructions stored therein, that when executed by the processor, cause the processor to perform operations that execute scripting commands in a dynamic browser graphical user interface to: perform natural language processing of text obtained from one or more media content items to identify context-relevant terms; locate one or more related content items from one or more content sources using the context-relevant terms; and display the related content items in the dynamic browser graphical user interface.

In Example 2, the subject matter of Example 1 can optionally include a display of the media content items in the dynamic browser graphical user interface.

In Example 3, the subject matter of one or any combination of Examples 1-2 can optionally include a display of the media content items provided to the user using a second device, wherein the display of the related content items is coordinated to the display of the media content items.

In Example 4, the subject matter of one or any combination of Examples 1-3 can optionally include the scripting commands executed in the dynamic browser graphical user interface performed by executing JavaScript instructions, the dynamic browser graphical user interface rendering one or more webpages or web applications compliant with an HTML5 markup language standard.

Example 5 can include, or can optionally be combined with the subject matter of one or any combination of Examples 1-4 to include a method performed by a computing device, comprising: performing natural language processing of text associated with content by executing client-side scripting commands within a graphical user interface, the natural language processing including: identifying a plurality of key term candidates in the text; and selecting context-sensitive key terms from the key term candidates based on usage within the text; determining related content from one or more content sources using the context-sensitive key terms; and displaying, to a user, the related content in the graphical user interface.

In Example 6, the subject matter of Example 5 can optionally include the graphical user interface being a browser, wherein displaying the related content in the graphical user interface includes providing a display of the related content in a webpage or web application compliant with HTML5 markup language standards using the browser.

In Example 7, the subject matter of one or any combination of Examples 5-6 can optionally include executing the client-side scripting commands including performing the natural language processing of the text using one or more JavaScript scripting commands within the graphical user interface.

In Example 8, the subject matter of one or any combination of Examples 5-7 can optionally include identifying the plurality of key term candidates in the text including: selecting key term candidates from one or more proper nouns and phrases in the text satisfying one or more predefined criteria.

In Example 9, the subject matter of one or any combination of Examples 5-8 can optionally include identifying the plurality of key term candidates in the text, including: accessing the text; tagging one or more parts of speech to the text; indexing the text based on a frequency of words by parts of speech; and determining key term candidates from phrases and proper nouns using the indexing of the text; wherein selecting the context-sensitive key terms from the key term candidates includes: determining context of the key term candidates within the text; and selecting key term candidates having common context with one or more other key term candidates within the text.

In Example 10, the subject matter of one or any combination of Examples 5-9 can optionally include displaying the related content to a user in the graphical user interface that occurs concurrently with a display of the content.

In Example 11, the subject matter of one or any combination of Examples 5-10 can optionally include the content and the related content each being displayed in the graphical user interface, the graphical user interface being provided on a same display device operable by a user.

In Example 12, the subject matter of one or any combination of Examples 5-11 can optionally include determining the related content including performing a search for the related content from the one or more content sources, the search including the context-sensitive key terms.

In Example 13, the subject matter of one or any combination of Examples 5-12 can optionally include the content including video, wherein the text associated with the content includes one or more of: a video transcription, subtitle text, or closed captioning text associated with the video.

Example 14 can include, or can optionally be combined with the subject matter of one or any combination of Examples 1-13 to include a computer-readable storage medium having computer-readable instructions, which when executed by a computer, cause the computer to provide a graphical user interface configured to: perform, using scripting instructions provided to the graphical user interface, natural language processing of text to extract one or more content terms, the text being associated with a set of first content; perform one or more queries using the content terms to locate and obtain a set of related content; and display the related content in the graphical user interface.

In Example 15, the subject matter of Example 14 can optionally include the graphical user interface being a browser, wherein the display of the related content is provided by rendering one or more webpages including the related content, the webpages including the related content providing a user-interactive display compliant with HTML5 markup language standards.

In Example 16, the subject matter of one or any combination of Examples 14-15 can optionally include a display of the first content in the browser, wherein the display of the first content is provided by rendering one or more webpages or web applications including the first content, the webpages or web applications providing a user-interactive display compliant with HTML5 markup language standards.

In Example 17, the subject matter of one or any combination of Examples 14-16 can optionally include the text associated with the set of first content being provided by a real-time datastream associated with the content.

In Example 18, the subject matter of one or any combination of Examples 14-17 can optionally include the datastream being provided from one or more of: closed captioning text, subtitle text, or metadata.

In Example 19, the subject matter of one or any combination of Examples 14-18 can optionally include the scripting instructions provided to the graphical user interface being JavaScript instructions configured for execution in a JavaScript-enabled display environment.

Example 20 can include, or can optionally be combined with the subject matter of one or any combination of Examples 1-19 to include a system, comprising: an output device configured to output a first set of content to a user; and a content processing system configured for providing related content from text associated with the first set of content, the content processing system including: a natural language processing component configured to determine terms related to the first set of content, the natural language processing performed using scripting commands; a content retrieval component configured to determine a second set of content related to the first set of content, using the terms related to the first set of content; and a user interface component configured to provide the second set of content to the user within a user interface, the user interface providing a dynamically generated display to the user using markup language.

In Example 21, the subject matter of Example 20 can optionally include a first content source providing the first set of content and the text associated with the first set of content; and a second content source providing the second set of content.

In Example 22, the subject matter of one or any combination of Examples 20-21 can optionally include the output device being further configured to output the user interface and the second set of content to the user.

In Example 23, the subject matter of one or any combination of Examples 20-22 can optionally include a second output device being configured to output the user interface and the second set of content to the user.

In Example 24, the subject matter of one or any combination of Examples 20-23 can optionally include the content retrieval and the natural language processing being performed using scripting executed within the user interface, wherein the content processing system is provided by software instructions executing on a processor of the output device.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment

What is claimed is:

1. A method performed by a second screen device for outputting content related to a media content item provided from a first electronic device, comprising:
   receiving a stream of text from the first electronic device, the stream of text corresponding to subtitle text of the media content item, wherein the media content item includes video content that is being displayed by the first electronic device, and wherein the stream of text is provided from the first electronic device to the second screen device separately from the video content;
   processing of the stream of text, in response to receiving the stream of text from the first electronic device, wherein the processing identifies a set of terms from the stream of text that are related to the video content that is being displayed by the first electronic device, and selects context-relevant terms from the set of terms based on frequency of occurrence in the set of terms;
   identifying a related content item from a content source using the selected context-relevant terms, in response to the processing of the stream of text; and
   displaying the related content item in a graphical user interface of the second screen device, wherein the related content item is displayed by the second screen device based on the video content being displayed by the first electronic device.

2. The method of claim 1, wherein the displaying of the related content item includes automatically displaying the related content item on the second screen device to be time coordinated with the display of the video content on the first electronic device.

3. The method of claim 1, wherein identifying the related content item includes automatically performing a search for related content from the content source, the search including the context-relevant terms.

4. The method of claim 1, further comprising:
   displaying a link to the related content item, wherein the displaying of the related content item is provided in the graphical user interface in response to user selection of the related content item link, and wherein displaying of the related content item link is provided in a browser.

5. The method of claim 1, the related content item includes at least one link to additional media content.

6. The method of claim 1, wherein the processing of the stream of text further includes: excluding a second set of terms from the strewn of text based on use as a part of speech in the stream of text, and ranking remaining terms of the context-relevant terms based on matches to words in metadata associated with the media content item.

7. The method of claim 1, wherein the stream of text includes textual content obtained from at least one of: a video transcription, subtitle, or closed captioning text associated with the video content.

8. The method of claim 1, wherein the stream of text is received from the first electronic device via a wireless Local Area Network (LAN) connection.

9. The method of claim 1, wherein the first electronic device is a television, wherein the second screen device is a portable electronic device, and wherein the portable electronic device is of a format of a tablet computer, a mobile telephone, or a laptop computer.

10. A second screen device, comprising:
    a display screen;
    at least one processor; and
    at least one memory device having a plurality of instructions stored therein, that when executed by the processor, cause the processor to perform operations to output content related to a media content item provided from a first electronic device, the operations to:
    receive a stream of text from the first electronic device, the stream of text corresponding to subtitle text of the media content item, wherein the media content item includes video content that is being displayed by the first electronic device, and wherein the stream of text is provided from the first electronic device to the second screen device separately from the video content;
    initiate processing of the strewn of text, in response to receiving the stream of text from the first electronic device, wherein the processing identifies a set of terms from the stream of text that are related to the video content that is being displayed by the first electronic device, and selects context-relevant terms from the set of terms based on frequency of occurrence in the set of terms;
    identify a related content item from a content source using the selected context-relevant terms, in response to the processing of the stream of text; and
    output the related content item in a graphical user interface of the second screen device, wherein the related content item is output by the second screen device based on the video content being displayed by the first electronic device.

11. The second screen device of claim 10, wherein the operations to output the related content item include automatically displaying the related content item on the second screen device to be time coordinated with the display of the video content on the first electronic device.

12. The second screen device of claim 10, wherein the operations to identify the related content item includes automatically performing a search for related content from the content source, the search including the context-relevant terms.

13. The second screen device of claim 10, the processor to perform further operations to:
output a link to the related content item, wherein the output of the related content item is provided in the graphical user interface in response to user selection of the related content item link, and wherein the output of the related content item link is provided in a browser.

14. The second screen device of claim 10, wherein the related content item includes at least one link to additional media content.

15. The second screen device of claim 10, wherein the processing of the stream of text further includes: excluding a second set of terms from the stream of text based on use as a part of speech in the strewn of text, and ranking remaining terms of the context-relevant terms based on matches to words in metadata associated with the media content item.

16. The second screen device of claim 10, wherein the stream of text includes textual content obtained from at least one of: a video transcription, subtitle, or closed captioning text associated with the video content.

17. The second screen device of claim 10, wherein the stream of text is received from the first electronic device via a wireless Local Area Network (LAN) connection.

18. The second screen device of claim 10, wherein the first electronic device is a television, wherein the second screen device is a portable electronic device, and wherein the portable electronic device is of a format of a tablet computer, a mobile telephone, or a laptop computer.

19. At least one non-transitory machine readable storage medium, comprising a plurality of instructions for outputting content related to a media content item provided from a first electronic device, wherein the instructions, responsive to being executed with processor circuitry of a second screen device, cause the processor circuitry to perform operations comprising:
receiving a stream of text from the first electronic device, the stream of text corresponding to subtitle text of the media content item, wherein the media content item includes video content that is being displayed by the first electronic device, and wherein the stream of text is provided from the first electronic device to the second screen device separately from the video content:,
processing of the stream of text, in response to receiving the stream of text from the first electronic device, wherein the processing identifies a set of terms from the stream of text that are related to the video content that is being displayed by the first electronic device, and selects context-relevant terms from the set of terms based on frequency of occurrence in the set of terms;
identifying a related content item from a content source using the selected context-relevant terms, in response to the processing of the stream of text; and
displaying the related content item in a graphical user interface of the second screen device, wherein the related content item is displayed by the second screen device based on the video content being displayed by the first electronic device.

20. The machine readable storage medium of claim 19, wherein the displaying of the related content item includes automatically displaying the related content item on the second screen device to be time coordinated with the display of the video content on the first electronic device.

21. The machine readable storage medium of claim 19, wherein identifying the related content item includes automatically performing a search for related content from the content source, the search including the context-relevant terms.

22. The machine readable storage medium of claim 19, the operations further comprising:
displaying a link to the related content item, wherein the displaying of the related content item is provided in the graphical user interface in response to user selection of the related content item link, and wherein displaying of the related content item link is provided in a browser.

23. The machine readable storage medium of claim 19, wherein the related content item includes at least one link to additional media content.

24. The machine readable storage medium of claim 19, wherein the processing of the stream of text further includes: excluding a second set of terms from the stream of text based on use as a part of speech in the stream of text, and ranking remaining terms of the context-relevant terms based on matches to words in metadata associated with the media content item.

25. The machine readable storage medium of claim 19, wherein the stream of text includes textual content obtained from at least one of: a video transcription, subtitle, or closed captioning text associated with the video content.

26. The machine readable storage medium of claim 19, wherein the stream of text is received from the first electronic device via a wireless Local Area Network (LAN) connection.

27. The machine readable storage medium of claim 19, wherein the first electronic device is a television, wherein the second screen device is a portable electronic device, and wherein the portable electronic device is of a format of a tablet computer, a mobile telephone, or a laptop computer.

* * * * *

UNITED STATES PATENT AND TRADEMARK OFFICE
CERTIFICATE OF CORRECTION

PATENT NO. : 10,366,169 B2  
APPLICATION NO. : 15/652030  
DATED : July 30, 2019  
INVENTOR(S) : Smith et al.

Page 1 of 1

It is certified that error appears in the above-identified patent and that said Letters Patent is hereby corrected as shown below:

On the Title Page

On page 2, in Column 1, item (56), under "Foreign Patent Documents", Line 1, delete "20770449 A" and insert --107704449 A-- therefor In the Claims In Column 18, Line 14, in Claim 5, after "claim 1,", insert --wherein--

In Column 18, Line 18, in Claim 6, delete "strewn" and insert --stream-- therefor In Column 18, Line 49, in Claim 10, delete "strewn" and insert --stream-- therefor In Column 19, Line 21, in Claim 15, delete "strewn" and insert --stream-- therefor In Column 19, Line 50, in Claim 19, delete "content:," and insert --content;-- therefor Signed and Sealed this  
Twenty-first Day of April, 2020

Andrei Iancu  
*Director of the United States Patent and Trademark Office*